United States Patent Office 3,397,952
Patented Aug. 20, 1968

3,397,952
PRODUCTION OF FUSED ALUMINA
George MacZura, East St. Louis, and Walter H. Gitzen, Belleville, Ill., assignors to Aluminum Company of America, Pittsburgh, Pa., a corporation of Pennsylvania
No Drawing. Filed Sept. 29, 1965, Ser. No. 491,403
6 Claims. (Cl. 23—141)

ABSTRACT OF THE DISCLOSURE

A method of producing fused alumina by mixing alumina having a Loss on Ignition of less than 0.5%, by weight, and alumina hydrate so that the Loss on Ignition of the resultant mixture is between 0.5% and 2.5%, by weight, and fusing the mixture.

---

This invention relates to a method of producing fused alumina and the material for producing the same. In particular this invention relates to a method of producing fused alumina for use in making abrasives and various electronic articles and the material used for producing the same.

Calcined alumina is a crystalline powder of considerable purity and relatively high whiteness. It has been found that upon fusing or melting calcined alumina, some color or tint often appears in the fused block or ingot, and this objectionable color or darkening remains in the particles after crushing and grinding.

An important instance of this fusion treatment of alumina is in the production of abrasives and various electronic articles. The theoretically pure crystalline alumina, i.e., the calcined alumina, is fused at a high temperature, usually in an electric arc resistance furnace. Such furnaces normally have graphite electrodes that strike an electric arc between them and the electrical resistance developed produces the high temperature necessary to melt or fuse the calcined alumina. Upon cooling the alumina melt, a fused alumina ingot is produced. The fused alumina ingot is then crushed or ground to the various appropriate particle sizes for abrasive use or for various electronic applications, such as for example ceramic heater coatings in vacuum tubes. Industrial demands for this material usually require it to be pure white, and any color or darkness adversely affects its commercial value.

Pure alpha alumina abrasives are known to have high quality abrasive characteristics such as "coolness of cut." That is, the heat generated by friction during abrading is kept to a minimum. Whiteness of the solidified alumina is an indication of abrasive quality. "Coolness of cut" can be enhanced by the formation of proper voids in the fused alumina ingot which in turn provide for minute pores or interstices in the grain or grit obtained by crushing the ingot. The minute interstices provide more sharp cutting edges on the grain periphery than would be the case with grain made from a fused ingot without the voids or with large or unevenly distributed voids. The alumina grain obtained from crushing the fused ingot is incorporated by well-known methods in various articles used for abrasion, such as grinding wheels and laps. The more even the distribution of the minute voids throughout the fused alumina ingot the easier it makes the crushing of the ingot to produce the desired grain or grit size as otherwise there are areas in the ingot that have large voids while other areas have poorly distributed voids making the crushing of these latter areas more difficult. The ease of crushing the ingot generally improves as the bulk density of the ingot decreases.

It will be particularly noted that the coloration mentioned above, usually gray and often quite dark, appears only after the alumina has been fused. As discharged from the calcining means, calcined alumina appears absolutely white, and its purity may be high by ordinary standards, yet the experience has been that the darkening in the subsequent fused product can nevertheless occur. Various theories have been expressed as to the origin of this color, but no satisfactory and economic way of eliminating it has been found. We have discovered that during the fusion process of the alumina, there is a tendency for the fused ingot to entrap carbon from the graphite electrodes which in turn causes some of the discoloration of the resultant fused alumina ingot.

Upon fusing alumina, there is a certain amount of beta alumina formed; this material may be said to be a sodium beta alumina of the formla $Na_2O \cdot 11Al_2O_3$; generally it is an objectionable material in that it does not have good abrasive qualities and it is unstable. The more sodium present in the alumina that is to be fused, the more undesirable beta alumina is formed during the fusing process. The formation of beta alumina represents a substantial loss in alumina satisfactory for abrasive purposes as the fused ingot upon crushing yields the beta alumina formed and it must be separated from the rest of the fused alumina and discarded. The sodium is normally present in a compound, usually referred to as "soda" and calculated as $Na_2O$. We have found, unfortunately, that the degree of discoloration in fused alumina decreases with an increased level of soda.

In the case of fused alumina used in electronic applications, it is important that the amount of sodium in the alumina be kept as low as possible as otherwise it interferes with the electrical performance of the component in which the fused alumina is used. In vacuum tubes, for instance, volatilization of the sodium can detrimentally affect the electrical conductance or performance of the component.

In the process of fusing alumina, as by means of an electric arc resistance furnace, it is important that the fusion characteristics of the process be good. The desired fusion process characteristics consist of minimized carbon entrapment in the fused alumina ingot from the graphite electrodes normally employed in the electric arc resistance furnace to melt or fuse the alumina, and minimum power consumption, that is, improved electrical efficiency of the fusing process necessary to fuse a given weight of the alumina. The less carbon entrapped in the fused alumina the better, as unless the carbon is removed from the fused alumina the alumina ingot will be discolored. The less power required to fuse a given weight of alumina, the more economical the fusion operation or process.

An object of this invention is to provide an improved process for producing fused alumina, and the material used in said process.

It is another object of this invention to provide an improved process for producing fused alumina ingots which are consistently white in color, and the material used in said process.

It is another object of this invention to provide an improved process for producing fused alumina ingots, which are white in color and have improved minute void distribution, and the material used in said process.

It is another object of this invention to provide an improved process for producing fused alumina that has a minimum amount of carbon entrapped from the electric arc resistance furnace electrodes, and the material used in said process.

It is another object of this invention to provide an improved process for producing fused solidified alumina that has a minimum amount of sodium beta alumina and the material used in said process.

It is another object of this invention to provide an improved process for producing fused alumina for use in electronic applications, and the material used in said process.

It has now been found that the above objects, and others which will become evident from the description herein, can be obtained by maintaining the Loss on Ignition of the alumina between 0.5% and 2.5%, by weight, and fusing the mixture. As used herein "Loss on Ignition" means the percentage of weight lost upon heating at 1100° C. after first exposing the material to a 50% relative humidity atmosphere. We have found that variation of water content or Loss on Ignition of the alumina which is fused will cause variations in the color of the fused alumina ingot to occur and that the amount of water in the alumina can adversely affect the characteristics of the fusing operation if it is not held within the above-mentioned limits. Alumina, however, will adsorb water from the atmosphere in varying amounts depending upon what the Loss on Ignition of the alumina is, the amount of water in the atmosphere, and the length of exposure of the alumina to the atmosphere. The proper Loss on Ignition of the alumina to be fused to achieve the desired results may be controlled and maintained at the proper level to give the desired fusion characteristics and the fused alumina ingot characteristics by mixing alumina having a Loss on Ignition of less than 0.5% and a sufficient amount of alumina hydrate to raise the Loss on Ignition of the resultant mixture to between 0.5% and 2.5%, by weight.

When the above-described alumina mixture having a Loss on Ignition within the stated range is fused, as by an electric arc resistance furnace, the fusion process characteristics are improved. That is, carbon entrapped in the fused alumina ingot from the graphite electrodes of the electric arc resistance furnace is kept to a minimum and the electrical power required to fuse the alumina mixture is also minimized when compared to fused alumina material not made in accordance with the invention. Moreover, the fused solidified alumina ingots are consistently white in color, they have good density, and good minute void size and distribution.

A further improvement in the alumina fusion process characteristics and the cast fused alumina may be achieved by having in the mixture of alumina and alumina hydrate, as above described, 0.05 to 1.0%, by weight, aluminum floride during the fusing process.

The alumina fluoride can be added to the alumina mixture as such or by the addition of a fluorine compound which produces aluminum fluoride in the alumina mixture by decomposition or reaction prior to or during the fusing operation, and references herein to adding aluminum fluoride to the alumina mixture embrace the addition of aluminum fluoride in any such fashion. The fluorine compound should not detrimentally affect the fusion process characteristics nor introduce an impurity that would caues discoloration of the fused alumina ingot thereby causing the cast fused alumina to be down-graded commercially. Hydrogen fluoride and fluosilicic acid are examples of fluorine compounds suitable for producing the aluminum fluoride prior to or during the fusing operation.

The aluminum fluoride may be mixed with the alumina at any time; the significant thing is that the aluminum fluoride be present in the mixture during the fusing operation. The preferred practice of this invention is to add aluminum fluoride as such as the proper amount can be readily controlled.

When a mixture of alumina having a Loss on Ignition of 0.5%, by weight, or less, sufficient alumina hydrate to raise the Loss on Ignition of the mixture to between 0.5% and 2.5%, by weight, and 0.05 to 1.0%, by weight, of aluminum fluoride is fused and solidified, the solidified alumina is more white, has improved void distribution, better density and displays improved fusion characteristics, than those achieved by the same material but without the specified amount of aluminum fluoride present during the fusing operation.

The following examples are illustrative of the practices of this invention.

Example I

Several lots of alumina with various Loss on Ignition percentages and added fluorine were evaluated by fusing 10-pound alumina ingots in an electric arc resistance furnace. The alumina used as the starting material had the following analysis: $Na_2O$, 0.057%; CaO, 0.029%; $SiO_2$, 0.021%; $B_2O_3$, 0.013%; $Fe_2O_3$, 0.009%; F, 0.003%; and the remainder $Al_2O_3$. The alumina had a Loss on Ignition of 0.23%. The alumina hydrate used as an additive to raise the Loss on Ignition of the mixture had a Loss on Ignition of 34.5%, a soda ($Na_2O$) content of 0.068% and a fluorine content on the basis of $Al_2O_3$ of 0.005%. The fused ingot color index evaluation is based on an arbitrary index ranging from 1 through 10 representing pure white and black colors, respectively. A rating of 1 to 7 is considered to be commercially acceptable and the closer to 1 the better. The results of these experiments are set forth in Table I below.

TABLE I

| Lot Nos. | Additives, Percent | | Loss on Ignition, Percent | Fused Ingot Color Index |
|---|---|---|---|---|
| | $AlF_3$ | Alumina Hydrate | | |
| 1 | 0 | 0 | 0.23 | 9.6 |
| 2 | 0 | 1.5 | 0.75 | 7.0 |
| 3 | 0.1 | 1.5 | 0.75 | 6.6 |
| 4 | 0.3 | 1.5 | 0.75 | 2.6 |

Example II

Two lots of alumina were evaluated by fusing 10-pound ingots in an electric arc resistance furnace and evaluated on the same color index as described in Example I above. The alumina used as the starting material had the following analysis: $Na_2O$, 0.44%; CaO, 0.05%; $SiO_2$, 0.023%; $B_2O_3$, <0.001%; $Fe_2O_3$, 0.023%; F, <0.01%; and the remainder $Al_2O_3$. The alumina had a Loss on Ignition of 0.22%. The alumina hydrate used as an additive to raise the Loss on Ignition of the mixture had a Loss on Ignition of 34.5%, a soda ($Na_2O$) content of 0.3% and a fluorine content on the basis of $Al_2O_3$ of 0.03%. The results of these experiments are set forth in Table II below.

TABLE II

| Lot Nos. | Additives, Percent | | Loss on Ignition, Percent | Fused Ingot Color Index |
|---|---|---|---|---|
| | $AlF_3$ | Alumina Hydrate | | |
| 1 | 0 | 0 | 0.22 | 8. |
| 1 | 0 | 0 | 0.2 | 8. |
| 2 | 0.3 | 5.5 | 2.10 | 3.3 |

As will be apparent to those skilled in the art in the light of the foregoing disclosure many modifications, alterations and substitutions are possible in the practice of this invention without departing from the spirit or scope thereof.

We claim:

1. A method of producing fused alumina, comprising mixing with alumina having a Loss on Ignition of less than 0.5%, by weight, a sufficient amount of alumina hydrate that the Loss on Ignition of the resultant mixture is between 0.5% and 2.5%, by weight, and fusing the said mixture.

2. A method in accordance with claim 1 in which the fused material is solidified.

3. A method in accordance with claim 1 in which there is also mixed with said alumina sufficient aluminum fluoride that the mixture contains 0.05 to 1%, by weight, of aluminum fluoride.

4. A method in accordance with claim 3 in which the fused material is solidified.

5. A mixture of material suitable for fusion consisting essentially of alumina having a Loss on Ignition of less than 0.5%, by weight, and a sufficient amount of alumina hydrate that the Loss on Ignition of the resultant mixture is between 0.5% and 2.5%, by weight.

6. A mixture of material suitable for fusion consisting essentially of alumina having a Loss on Ignition of less than 0.5%, by weight, a sufficient amount of alumina hydrate that the Loss on Ignition of the resultant mixture is between 0.5% and 2.5%, by weight, and 0.05 to 1.0%, by weight, aluminum fluoride.

References Cited

UNITED STATES PATENTS

| | | | |
|---|---|---|---|
| 811,433 | 1/1906 | Pechiney | 23—142 |
| 1,263,709 | 4/1918 | Saunders et al. | 23—142 X |
| 3,220,862 | 11/1965 | Miller | 106—65 |

OSCAR R. VERTIZ, *Primary Examiner.*

G. T. OZAKI, *Assistant Examiner.*